United States Patent [19]

Lewis et al.

[11] Patent Number: 4,494,821

[45] Date of Patent: Jan. 22, 1985

[54] LASER PRINTING SYSTEM WITH DEVELOPABLE HELICOID REFLECTOR

[75] Inventors: John R. Lewis, Stow; Andrew McCurdy, Danvers; Arthur D. Gaudet, Waltham, all of Mass.

[73] Assignee: Polaroid Corporation, Cambridge, Mass.

[21] Appl. No.: 472,733

[22] Filed: Mar. 7, 1983

[51] Int. Cl.³ .............................................. G02B 27/17
[52] U.S. Cl. ..................................... 350/6.5; 350/448; 358/293
[58] Field of Search ................ 350/6.5, 6.6, 319, 314, 350/486, 448; 358/293; 355/51; 250/235, 237

[56] References Cited

U.S. PATENT DOCUMENTS

| | | | |
|---|---|---|---|
| 2,021,889 | 11/1935 | Fahrney | 178/6 |
| 2,072,528 | 3/1937 | Nicolson | 178/6 |
| 2,443,258 | 6/1948 | Lindenblad | 88/1 |
| 3,270,132 | 8/1966 | Richey | 178/7.6 |
| 3,360,659 | 12/1967 | Young | 250/236 |
| 3,389,218 | 6/1968 | Balamuth et al. | 178/6.6 |
| 3,523,160 | 8/1970 | Willey | 178/7.6 |
| 3,618,487 | 11/1971 | Tiefenthal et al. | 350/6.5 |
| 3,729,248 | 4/1973 | Beduchaud | 350/6.5 |
| 4,066,328 | 1/1978 | Paulus et al. | 350/6.5 |
| 4,084,197 | 4/1978 | Starkweather | 358/293 |
| 4,205,348 | 5/1980 | DeBenedictis et al. | 358/293 |
| 4,321,630 | 3/1982 | Kramer | 358/293 |

OTHER PUBLICATIONS

Lectures on Classical Differential Geometry, by Dirk J. Struik, pp. 69-71, Addison-Wesley Publishing Company, Inc., 2nd Edition.

Primary Examiner—Jon W. Henry
Attorney, Agent, or Firm—Edward S. Roman

[57] ABSTRACT

Line scanning apparatus are especially compensated to limit beam divergence in one direction by embodying a specularly reflective developable helicoid. Beam divergence in the direction orthogonal to the aforementioned one direction is masked by a narrow slit extending longitudinally in the direction of the longitudinal center axis of the helicoid.

16 Claims, 4 Drawing Figures

LASER PRINTING SYSTEM WITH DEVELOPABLE HELICOID REFLECTOR

BACKGROUND OF THE INVENTION

1. Field of the Invention

This invention relates generally to line scanning apparatus and, more particularly, to a helical line scanning apparatus especially compensated for beam divergence.

2. Description of the Prior Art

Line scanning apparatus of the type embodying a rotating pyramidal or polygonal mirror comprising individual reflecting surfaces to scan a beam across a target are well known in the art as mechanical flying spot scanners. Line scanning apparatus of a type disclosed in U.S. Pat. No. 3,523,160, entitled "Optical Scanning Device Having A Constant Optical Path Length", by R. Willey, issued Aug. 4, 1970, include a helical mirror from which an optical beam is reflected in a manner whereby one complete scan of a target is made for every revolution of the helix. The line scanning device may be utilized with either a noncollimated light beam or a collimated light beam, such as a laser beam. Willey concludes that the use of a collimated light source with his scanning device eliminates the focusing problem and permits the target to be placed at any desired distance from the drum and at practically any angle with respect to the reflected beam. However, depending upon the precision of the line scan required, focusing problems can materialize particularly in situations requiring a precise line scan to provide photographic quality prints, despite the use of a laser as the light source. Such problems arise as a result of the collimated light beam being reflected by the helical surface which by its very nature cannot be made to conform to a zero curvature. Hence, the reflected light beam from the helical surface is inherently astigmatic and thereby increases the width of the line scan and decreases the resolution to which each line scan can be modulated.

Therefore, it is a primary object of this invention to provide a line scanning apparatus which is especially compensated and masked in a simple and economical manner to minimize the effects of the divergence of a light beam reflected from a helical surface.

Other objects of the invention will in part be obvious and will in part appear hereinafter. The invention accordingly comprises the mechanism and system possessing the construction, the combination of elements and the arrangement of parts which are exemplified in the following detailed disclosure.

SUMMARY OF THE INVENTION

Line scanning apparatus for use with a photosensitive medium comprise a light source for providing preferably a beam of collimated light. A specularly reflective developable helicoid is disposed for rotation about the longitudinal center axis thereof to receive incident thereto the collimated light beam in a direction generally parallel to the longitudinal center axis so as to reflect the incident beam in a direction outward of the longitudinal axis toward the photosensitive medium. One rotation of the helicoid operates to displace the reflected beam of radiation in one direction parallel to the longitudinal center axis to provide one line scan across the photosensitive medium. Drive means are included for rotating the helicoid and incrementally advancing the photosensitive medium subsequent to each of the line scans. Means are also provided for optically controlling the reflected light beam from the helicoid so as to limit the divergence of the reflected light beam in directions generally perpendicular to the longitudinal center axis of the helicoid. The optical means may comprise an opaque masking sheet fixedly spaced between the helicoid and the photosensitive film wherein the opaque sheet includes a radiation transmitting slit therethrough extending parallel to the longitudinal center axis of the helicoid and centered on the reflected beam. The edges of the radiation transmitting slit preferably include a variable gradient density in order to reduce the amount of energy from the reflected light beam diffracted by the slit. Alternatively, the optical means may comprise a cylindrical lens either in place of the masking sheet or in combination with the masking sheet.

DESCRIPTION OF THE DRAWINGS

The novel features that are considered characteristic of the invention are set forth with particularity in the appended claims. The invention itself, however, both as to its organization and its method of operation, together with other objects and advantages thereof, will be best understood from the following description of the illustrated embodiment or when read in connection with the accompanying drawings where like members have been employed in the different figures to note the same parts and wherein:

DESCRIPTION OF THE PREFERRED EMBODIMENTS

Figure 1:
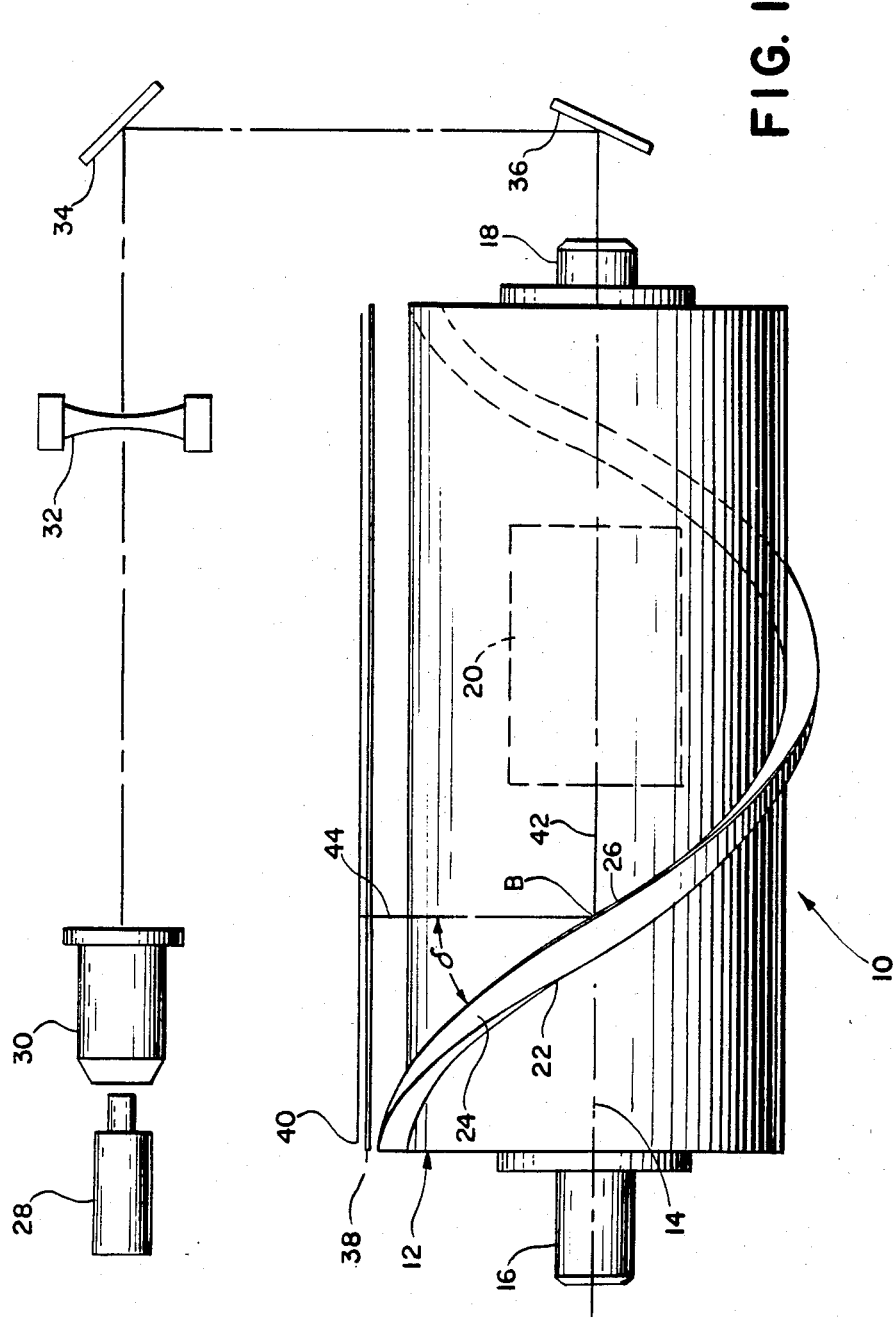
FIG. 1 is a front view showing the line scanning apparatus of this invention.
Figure 3B:
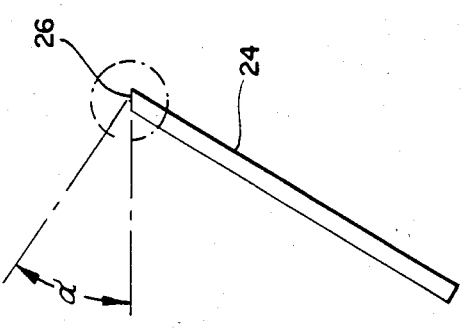
FIG. 3B is a cross-sectional view taken across the lines 3B—3B of FIG. 3A.
Figure 3A:
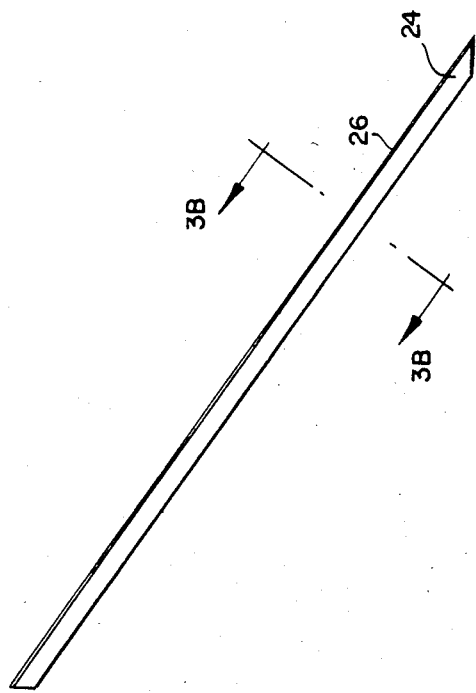
FIG. 3A is a plan view showing a portion of the line scanning apparatus of FIG. 1 prior to its assembly in FIG. 1.

Referring now to FIG. 1 there is shown at 10 the line scanning system of this invention which comprises a cylinder or drum 12 disposed for rotation about its longitudinal center axis 14 by two shaft members 16 and 18 extending laterally from opposite ends of the cylinder 14. The shaft members 16 and 18 are supported for rotation by appropriate bearings (not shown) in any well-known manner. A square helix 22 is convolutely wound around the cylinder 12, and a helical strip 24 is thereafter wound around the outside surface of the square helix 22. The square helix 22 may be integrally formed with respect to the cylinder 12, and the helical strip 24 may be fixedly connected to the outside surface of the square helix 22 in any well-known manner. The helical strip 24 is best shown in FIGS. 3A and 3B in its unwound condition wherein one edge surface of the helical strip 24 comprises a specularly reflective developable helicoid 26 for reasons for which will become apparent from the following discussion.

Figure 2:
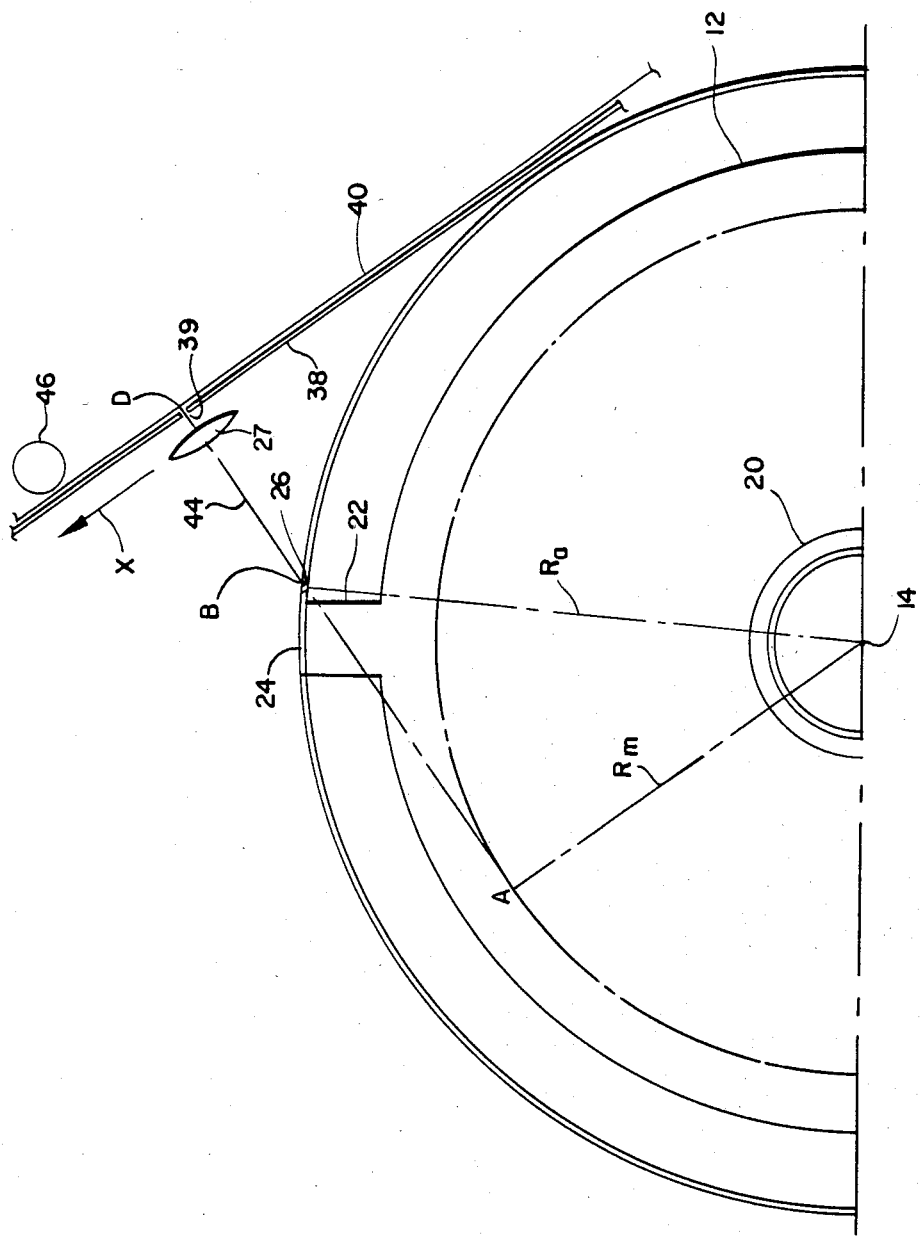
FIG. 2 is a side view showing a portion of the line scanning apparatus of FIG. 1.

The preferred source of radiation is a laser diode 28 which provides a collimated beam of light. The laser diode 28 is preferably stationed near the focal plane of a microscope objective 30 which has a large numerical aperture to provide a high degree of collection efficiency with respect to the light received from the laser diode 28. A slightly converging beam is emitted from the microscope objective 30 toward a negative lens 32 which operates to alter the converging characteristics of the incident light beam. The direction of the light beam is thereafter altered by a pair of turning mirrors 34 and 36 so as to finally impinge upon the specularly reflective developable helicoid 26 in a direction generally parallel to the longitudinal center axis 14 of the cylinder 12. The incident light beam diagrammatically illustrated by the phantom center line 42 is thereafter reflected at B by the developable helicoid 26 in a direction outward from the longitudinal center axis 14 toward a film plane 40 on which a photosensitive medium can be stationed. Intermediate the film plane 40 and the cylinder 12, there is provided in the manner of this invention an optical control means comprising an opaque masking sheet 38 stationed in spaced apart parallel relationship with respect to the film plane 40. The mask 38 includes a light transmitting slit 39 therethrough as best seen in FIG. 2 extending parallel to the longitudinal center axis 14 and centered on the reflected beam of light which is diagrammatically illustrated by the phantom center line 44. Alternatively, the optical control means could comprise a cylindrical lens 27 extending the length of the center axis 14 either in place of the mask 38 or in combination with the mask 38.

As will be readily understood, a line scanning operation is provided by rotatably driving the cylinder 12 in a well-known manner so as to cause the incident light beam 42 to traverse the length of the developable helicoid 26 and thereby displace the reflected beam of light 44 in a direction parallel to the longitudinal center axis 14 along the width of the film plane 40. Such rotation may be provided in a well-known manner by a motor 20 mounted within the cylinder 12. The motor 20 may be of a well-known type wherein the shaft is fixedly stationed and the outer housing rotates with respect to the motor shaft. As is now readily apparent, one rotation of the cylinder 12 operates to scan the reflected light beam 44 a distance substantially equal to the pitch of the developable helicoid 26 to provide a single line scan across the width of the photosensitive medium stationed at the film plane 40. Thus the width of the photosensitive medium at the film plane 40 is preferably no greater than the pitch of the developable helicoid 26. After each line scan provided in the aforementioned manner, the photosensitive medium must be incrementally advanced lengthwise so that the next succeeding line scan does not overlap the immediately preceding line scan. Such incremental advancement may be provided in a well-known manner as best shown in FIG. 2 by a drive roller 46 driven in any well-known manner as by a stepper motor (not shown) to advance the photosensitive medium in the direction as shown by the arrow X. Alternatively, the helicoid 26 may be moved in any well-known manner while the film plane 40 remains stationary.

Although the laser diode 28 in cooperation with the objective 30 and negative lens 32 provide a collimated beam of light 42 incident to the specularly reflective developable helicoid 26, the reflected beam of light 44 is not collimated and instead diverges due to the nature of the reflecting surface which cannot be made to conform to zero curvature. Such beam divergence would, if uncompensated, operate to enlarge the cross-sectional area of the light beam incident to the film plane 40. Such divergence is partly compensated in the manner of this invention by the specularly reflective developable helicoid 26 which provides zero curvature in one direction so as to confine the effect of beam divergence to only the direction perpendicular to the longitudinal center axis 14 of the cylinder 12 and thereby achieve an astigmatic line focus on the film plane 40. The developable helicoid 26 is characterized as shown in FIGS. 3A and 3B by being formed from bending a plane surface, without stretching or shrinking, so that the metrical properties of the plane surface remain unchanged; see "Lectures on Classical Differential Geometry", by Dirk Struik, Addison-Wesley Publishing Co., pages 69-71. As is readily apparent, the specularly reflective surface 26 and its associated strip 24 can be convolutely wound around the square helix 22 of the cylinder 12 to substantially define a developable helicoid without materially stretching or shrinking the strip 24 and its associated specularly reflective surface 26. Thus the specularly reflective developable helicoid surface 26 operates to limit the divergence of the reflected light beam 44 to only the directions perpendicular to the longitudinal center axis 14 of the cylinder 12. In addition, it is preferred that the specularly reflective surface 26 be substantially narrower than the width of the incident light beam 42 thereby reflecting only a portion of the incident beam 42 so as to effectively mask two sides of the beam.

Divergence of the reflected light beam 44 in the direction perpendicular to the longitudinal center axis 14 is compensated by the cylindrical lens 27 and/or the mask 38 which includes the light transmitting slit 39 as best shown in FIG. 2 extending the length of the pitch of the developable helicoid 26. As is readily apparent, the shape of the light beam that passes through the slit 39 is formed by the intersection of the incident light beam with the slit 39. Since the divergence of the reflected light beam 44 in a direction generally parallel to the longitudinal center axis 14 is limited by the geometry of the specularly reflective developable helicoid 26 in the aforementioned manner, the cross section of the light beam emanating from the slit 39 will be a parallelogram defining the appropriate pixel size at the film plane 40. Thus by especially configuring the specularly reflective surface 26 as a narrow developable helicoid in conjunction with a cylindrical lens 27 and/or a single fixedly stationed mask 38 having a single slit extending parallel to the longitudinal center axis 14 and centered on the reflected light beam 44, there is provided a simple and economical means for masking the divergence of the reflected light beam 44 in directions both parallel and perpendicular to the longitudinal center axis 14 of the cylinder 12 in the manner of this invention.

In situations where the specularly reflective surface 26 is a developable helicoid and any normal of the surface 26 makes an angle of 45° with the center axis 14, it is necessary that the developable helicoid 26 be provided with a minimum radius $R_m$ as shown in FIG. 2 which is related to the pitch of the helicoid by the following equation:

$$R_m = \frac{\text{pitch}}{2\pi}.$$

This minimum radius $R_m$, however, would generally be unsuitable as the actual radius for the developable helicoid 26 since it would result in too great a divergence for the reflected beam 44. Thus the actual radius $R_a$ as shown in FIG. 2 is selected to be typically in the order of one and one-half times the minimum radius $R_m$ so as to provide an acceptable balance with regard to the divergence of the reflected light beam 44 and the actual size of the developable helicoid 26.

In order to determine the direction in which an incident ray is reflected from the specularly reflective developable helicoid 26 at point B as shown in FIG. 2, there is projected a line from the point B to point A at which the line is tangent to a circle defined by the minimum radius $R_m$. The reflected beam of light 44 thus appears as if a source is present at A, and the direction of the reflected beam 44 is in a line outward from the line AB as shown in FIG. 2. As is readily apparent, the triangle defined by the points AB with the center axis 14 is a right triangle and the degree of divergence of the reflected beam 44 corresponds to the distance between the point of reflection B from the developable helicoid 26 to the point of incidence D at the film plane 40 for the reflected beam 44.

Divergence of the reflected beam 44 could be minimized by placing the slit 39 and the film plane 40 in a location immediately adjacent the point of reflection B from the developable helicoid 26. However, such an arrangement would result in a nonnormal incidence of the reflected beam 44 with respect to the film plane 40 so as to increase and distort the cross-sectional area of the beam incident to the film plane 40. It is therefore preferable to position the plane of the mask 38 and the film plane 40 so as to be perpendicular to the direction of incidence of the reflected beam 44 thereby requiring that the distance from A to D be no less than the actual radius $R_a$. Assuming a minimal spacing between the mask 38 and the film plane 40 it can be seen from FIG. 2 that the cross-sectional width of the reflected beam 44 incident to the film plane 40 in a direction perpendicular to the longitudinal center axis 14 approximates the width of the slit 39 while the width of the light beam incident to the film plane 40 in a direction parallel to the longitudinal center axis 14 is determined by both the pitch angle δ of the developable helicoid 26 as shown in FIG. 1 and the thickness of the specularly reflective developable helicoid 26. Thus it becomes readily apparent that the distance (B-D) traveled by the light beam after reflection relative to the distance (A-B) of the apparent source can be made smaller by increasing the ratio of the actual radius $R_a$ to the minimum radius $R_m$ so as to reduce the divergence of the reflected light beam 44 at the expense of increasing the size of the developable helicoid 26.

It is generally preferable that the geometry of the developable helicoid 26 be chosen so that the reflected light beam 44 travels in a plane perpendicular to the center axis 14. Toward this end, the pitch angle δ as shown in FIG. 1 is determined by the following function: tangent $$\delta = \frac{R_a}{R_m}.$$

In addition, the angle of the specularly reflective developable helicoid α is also determined by the following function:

$$\sin \alpha = \frac{\sqrt{R_a^2 - R_m^2}}{R_a} \times \sqrt{\frac{1}{2}}$$

Thus determining the angles α and δ in the aforementioned manner assures that the reflected beam of light 44 will lie in a plane perpendicular to the longitudinal center axis 14 and thus be normal to the film plane 40.

In order to reduce the amount of energy of the reflected light beam 44 diffracted by the slit 39, it may be preferable that the edges of the slit 39 be defined by a variable gradient density filter which operates to blur or soften the edge of the slit 39. In addition, although a laser diode source of light has been shown as the preferred arrangement, it will be readily apparent that the aforementioned invention could also be utilized with noncollimated light sources as well as other radiation sources in the nonvisible spectrum.

Other embodiments of the invention including additions, subtractions, deletions and other modifications of the preferred disclosed embodiments of the invention will be obvious to those skilled in the art and are within the scope of the following claims.

What is claimed is:

1. Line scanning apparatus for use with a source of radiation that can be beamed thereat, to scan the beamed radiation across a radiation sensitive medium in a plurality of successive line scans, said apparatus comprising:

a specularly reflective developable helicoid disposed for rotation about the longitudinal center axis thereof to receive an incident beam of radiation from the source in a direction generally parallel to said longitudinal center axis and reflect the incident beam of radiation in a direction outward of said longitudinal center axis toward the radiation sensitive medium wherein one rotation of said helicoid operates to displace the reflected beam of radiation in one direction parallel to said longitudinal center axis; and means for optically controlling said reflected radiation from said helicoid so as to limit the divergence of the reflected radiation in directions generally perpendicular to the longitudinal center axis of said helicoid.

2. The line scanning apparatus of claim 1 wherein said optical control means comprises an opaque masking sheet fixedly spaced between said helicoid and the radiation sensitive medium, said opaque sheet having a radiation transmitting slit therethrough extending parallel to said longitudinal center axis and centered on the reflected beam of radiation.

3. The line scanning apparatus of claim 2 wherein the edges of said radiation transmitting slit have a variable gradient density so as to reduce the amount of energy from the reflected beam diffracted by said slit.

4. The line scanning apparatus of claim 2 wherein the plane of the radiation sensitive medium and said opaque masking sheet are perpendicular to the reflected beam of radiation.

5. The line scanning apparatus of claim 1 wherein said optical means comprises a cylindrical lens extending parallel to said longitudinal center axis and centered on the reflected beam of radiation.

6. The line scanning apparatus of claim 1 wherein the actual radius ($R_a$) from said longitudinal center axis to a point coincident with the center of the incident beam of radiation is selected from a range of radii of which the minimum radius ($R_m$) is equal to the pitch of said helicoid divided by $2\pi$.

7. The line scanning apparatus of claim 6 wherein the reflected beam of radiation from said helicoid is perpendicular to said longitudinal center axis and the plane of the radiation sensitive medium.

8. The line scanning apparatus of claim 7 wherein the sine of the angle of the specularly reflective surface of said helicoid is equal to $$\frac{\sqrt{R_a^2 - R_m^2}}{R_a} \times \sqrt{\frac{1}{2}}$$

and the tangent of the angle of the pitch of said helicoid is equal to said actual radius ($R_a$) divided by said minimum radius ($R_m$).

9. Apparatus for line scanning a photosensitive medium comprising:
   a light source for providing a beam of collimated light;
   a specularly reflective developable helicoid disposed for rotation about the longitudinal center axis thereof to receive incident thereto said collimated light beam in a direction generally parallel to said longitudinal center axis and reflect said incident light beam in a direction outward of said longitudinal center axis toward the photosensitive medium wherein one rotation of said helicoid operates to displace the reflected beam of radiation in one direction parallel to said longitudinal center axis to provide one line scan across the photosensitive medium;
   drive means for rotating said helicoid and incrementally changing the positions of the photosensitive medium and said helicoid relative to each other subsequent to each of said line scans; and
   means for optically controlling said reflected light beam from said helicoid so as to limit the divergence of said reflected light beam in directions generally perpendicular to the longitudinal center axis of said helicoid.

10. The line scanning apparatus of claim 9 wherein said optical control means comprises an opaque masking sheet fixedly spaced between said helicoid and the photosensitive film, said opaque sheet having a radiation transmitting slit therethrough extending parallel to said longitudinal center axis and centered on the reflected light beam.

11. The line scanning apparatus of claim 10 wherein the edges of said radiation transmitting slit have a variable gradient density so as to reduce the amount of energy from the reflected light beam diffracted by said slit.

12. The line scanning apparatus of claim 11 wherein the plane of the photosensitive medium and said opaque masking sheet are perpendicular to the reflected light beam.

13. The line scanning apparatus of claim 9 wherein said optical control means comprises a cylindrical lens extending parallel to said longitudinal center axis and centered on the reflected beam of radiation.

14. The line scanning apparatus of claim 9 wherein the actual radius ($R_a$) from said longitudinal center axis to a point coincident with the center of the incident beam of radiation is selected from a range of radii of which the minimum radius ($R_m$) is equal to the pitch of said helicoid divided by $2\pi$.

15. The line scanning apparatus of claim 14 wherein the reflected beam of radiation from said helicoid is perpendicular to said longitudinal center axis and the plane of the photosensitive medium.

16. The line scanning apparatus of claim 15 wherein the sine of the angle of the specularly reflective surface of said helicoid is equal to $$\frac{\sqrt{R_a^2 - R_m^2}}{R_a} \times \sqrt{\frac{1}{2}}$$

and the tangent of the angle of the pitch of said helicoid is equal to said actual radius divided by said minimum radius.

* * * * *